United States Patent [19]

Alexander et al.

[11] Patent Number: 4,642,783
[45] Date of Patent: Feb. 10, 1987

[54] LIFE RAFT TESTING DEVICE

[75] Inventors: William B. Alexander, New Orleans, La.; Paul Frenger, Houston, Tex.

[73] Assignee: Safe-test, Inc., New Orleans, La.

[21] Appl. No.: 619,601

[22] Filed: Jun. 11, 1984

[51] Int. Cl.$^4$ .................. G06F 15/20; G01N 7/00
[52] U.S. Cl. ........................ 364/551; 364/558; 441/41
[58] Field of Search .............. 364/558, 557, 567, 550, 364/551, 571; 73/714, 720, 721, 726, 727, 753, 146.8; 441/40, 41, 42

[56] References Cited

U.S. PATENT DOCUMENTS

| 2,683,030 | 7/1954 | Caule | 73/753 |
| 4,038,532 | 7/1977 | Burris et al. | 364/558 |
| 4,143,545 | 3/1979 | Sitabkhan | 73/146.8 |
| 4,234,926 | 11/1980 | Wallace et al. | 364/551 |
| 4,551,795 | 11/1985 | Fisher et al. | 364/571 |

FOREIGN PATENT DOCUMENTS

| 0022565 | 1/1981 | European Pat. Off. |
| 8001317 | 6/1980 | PCT Int'l. Appl |
| 8201589 | 5/1982 | PCT Int'l. Appl |
| 8204124 | 11/1982 | PCT Int'l. Appl |
| 2008255 | 5/1979 | United Kingdom |
| 2096773 | 10/1982 | United Kingdom |
| 2100439 | 12/1982 | United Kingdom |
| 2107066 | 4/1983 | United Kingdom |
| 2114775 | 2/1984 | United Kingdom |

Primary Examiner—Gary Chin
Attorney, Agent, or Firm—Dula, Shields & Egbert

[57] ABSTRACT

A life raft testing device comprising an arrangement of transducer sensors; connectors between the transducers and the life raft desired to be tested; processors electrically connected to the transducer sensors; a controller electrically connected to and interactive with the processors; and a display of the electrical output. The transducer sensors comprise a pressure transducer, a temperature transducer, and a load cell transducer. The temperature transducer is positioned generally adjacent to the nozzle of the life raft. The processors of the present invention comprise a multiplexer electrically connected to the transducer sensors, a differential amplifier electrically connected to the multiplexer, and a sample/hold amplifier electrically connected between the analog-to-digital converter and the differential amplifier. The controller comprises an input/output keyboard connected to the processors through an RS-232 communication line. The output display is a video display terminal and/or a serial type line printer. The controller includes the means to execute a raft protocol under program control communicating commands to and data from the processor means.

7 Claims, 3 Drawing Figures

LIFE RAFT TESTING DEVICE

TECHNICAL FIELD

The present invention relates to testing devices. More particularly, the present invention relates to devices for testing pressure vessels, such as life rafts, through which a variety of physical variables may be monitored and measured.

BACKGROUND ART

During the past five years, the U.S. Coast Guard has stated its intention to discontinue witnessing annual testing of life rafts used on Coast Guard certificated vessels and drilling rigs as a cost savings measure to taxpayers. The Coast Guard has been investigating alternative methods of overseeing this critical function. The Coast Guard has considered, as an alternative, accepting witnessing from independent, qualified third party agencies such as the American Bureau of Shipping or the Underwriters Laboratories.

The technique of using independent third party inspectors is an extremely expensive approach. Studies have indicated that the cost of having a third party independent inspector for facilities in the Gulf Coast area would be in excess of $200.000 per year. This cost, projected throughout the United States and the multiple service facilities, would be a completely unacceptable expense to the owners and users of inflatable rafts.

A number of serious problems have become evident relative to the overseas testing of rig vessels, support vessels, and helicopter inflatables. A first major problem associated with the overseas testing of these facilities relates to the servicing aspect. Servicing is often difficult and unreliable. Offshore operators often purchase extra rafts in order to facilitate returning rafts to U.S. service stations for annual inspections. Secondly, the requirement of obtaining U.S. Coast Guard personnel to witness inspections overseas is often difficult, if not impossible, for equipment manufacturers. Thirdly, and the central point of this analysis, is that overseas inspection of life rafts and other safety equipment is extremely expensive.

Heretofore, extremely cumbersome techniques for the manual testing of life rafts have been available. Generally, computer technology and associated electronics have not been incorporated into the testing procedures. Therefore, the present invention was developed to solve a long felt need in the area of life raft testing.

A number of patents have issued in the past that concern themselves with pressure measurement, weight detection, and pressure vessel testing procedures. None of these prior art patents is believed to be related to the field of life raft testing. U.S. Pat. No. 4,144,879 describes a blood pressure measuring instrument. This device measures blood pressure by applying pressure to a blood vessel from the outside. The pressure resulting from the movement of the blood pressure during the pressure reduction is converted by a pressure sensor into an electric signal. The converted output is differentiated twice. A first-polarity pulse, a second-polarity pulse and another first-polarity pulse are generated successively in the differentiated output waveform within a predetermined period of time. These values are then converted into a digital form and recorded. U.S. Pat. No. 3,826,125 describes a pressure testing vessel adapted to show internal fluid pressure. This testing device operates by applying an external source of fluid pressure to an indicator acting in opposition to the internal pressure. The effect of the applied external pressure on the operation of the indicator is observed and recorded. U.S. Pat. No. 3,487,677 describes a method for leak detection. U.S. Pat. No. 3,494,178 describes another leak testing method and apparatus. Neither of these leak testing and detection methods is related to the technique of the present invention. U.S. Pat. No. 3,555,881 describes a non-destructive testing method. In this method, a graphic record of pressure and volume is made during the introduction of a pressurizing fluid to a pressure vessel. The rise in pressure is a function of the volume of fluid introduced. The stress to strain relationship of vessel material is proportional respectively to the pressure and volume injected up to the elastic limit. Various recordings are made of these measurements and translated into a graphic illustration of integrity of the pressure vessel.

It is an object of the present invention to provide a life raft testing device that eliminates the need for a third party witness to the testing procedure.

It is another object of the present invention to provide a life raft testing device that is portable and relatively simple to implement.

It is another object of the present invention to provide a life raft testing device that incorporates modern electronics into the measurement of pressure, temperature, load, and other physical variables.

It is still a further object of the present invention to provide a life raft testing device that is cost-effective in comparison with previous techniques of measurement.

These and other objects and advantages of the present invention will become apparent from a reading of the attached specification and appended Claims.

DISCLOSURE OF THE INVENTION

The present invention is a life raft testing device comprising: a transducer sensor for converting a physical input into an electrical impulse, a connector arranged about the transducer sensor for enabling the transducer sensor to be interactive with the source of the physical input, a processor electrically connected to the transducer sensor for selectively converting the electrical impulse of the transducer sensor into a signal relative to the physical input, control means electrically connected to and interactive with the processor for selectively manipulating the signal from the processor, and an output display electrically connected to the controller for producing a humanly perceivable display of the signal from the processor.

A variety of transducer sensors are available for the purposes of the present invention. First, the transducer sensor may be a pressure transducer having a nozzle-type connector for connecting to a valve about an air pressure vessel. The pressure transducer has a chamber generally adjacent the nozzle for allowing the differential pressures between the chamber and the air pressure vessel to equalize. A temperature transducer is included generally adjacent the nozzle-type connector. The transducer sensor may also be a load cell transducer for weight measurement. The load cell transducer comprises a hook for receiving the weight of the life raft to be measured. This hook is interactive with the transducer sensor and is physically connected to the transducer.

The processor of the present invention comprises a programmable-gain differential amplifier electrically connected to the transducer sensors for producing an analog signal relative to the electrical impulse from the transducer sensor. The processor also comprises an analog-to-digital converter electrically connected to the sample-hold amplifier for converting the analog signal to a digital output. A multiplexer is electrically connected to the transducer sensor so as to be receptive of the signals from a plurality of the transducers. The multiplexer selectively passes a signal to the programmable-gain differential amplifier. The processor still further comprises a sample/hold amplifier electrically connected between the analog-to-digital converter and the differential amplifier. The sample/hold amplifier captures the voltage output from the differential amplifier for a predetermined period of time.

The controller of the present invention comprises an input/output keyboard. This input/output keyboard is connected to and interactive with the processor by way of an RS-232 communication line. The output display of the present invention is a video display terminal connected to and interactive with the controller and the processor. Alternatively, the output display comprises a serial type line printer electrically connected to the controller and interactive with the processor. The apparatus of the present invention is supplied with power through a battery connected to the processor.

BEST MODE FOR CARRYING OUT THE INVENTION

Figure 1:
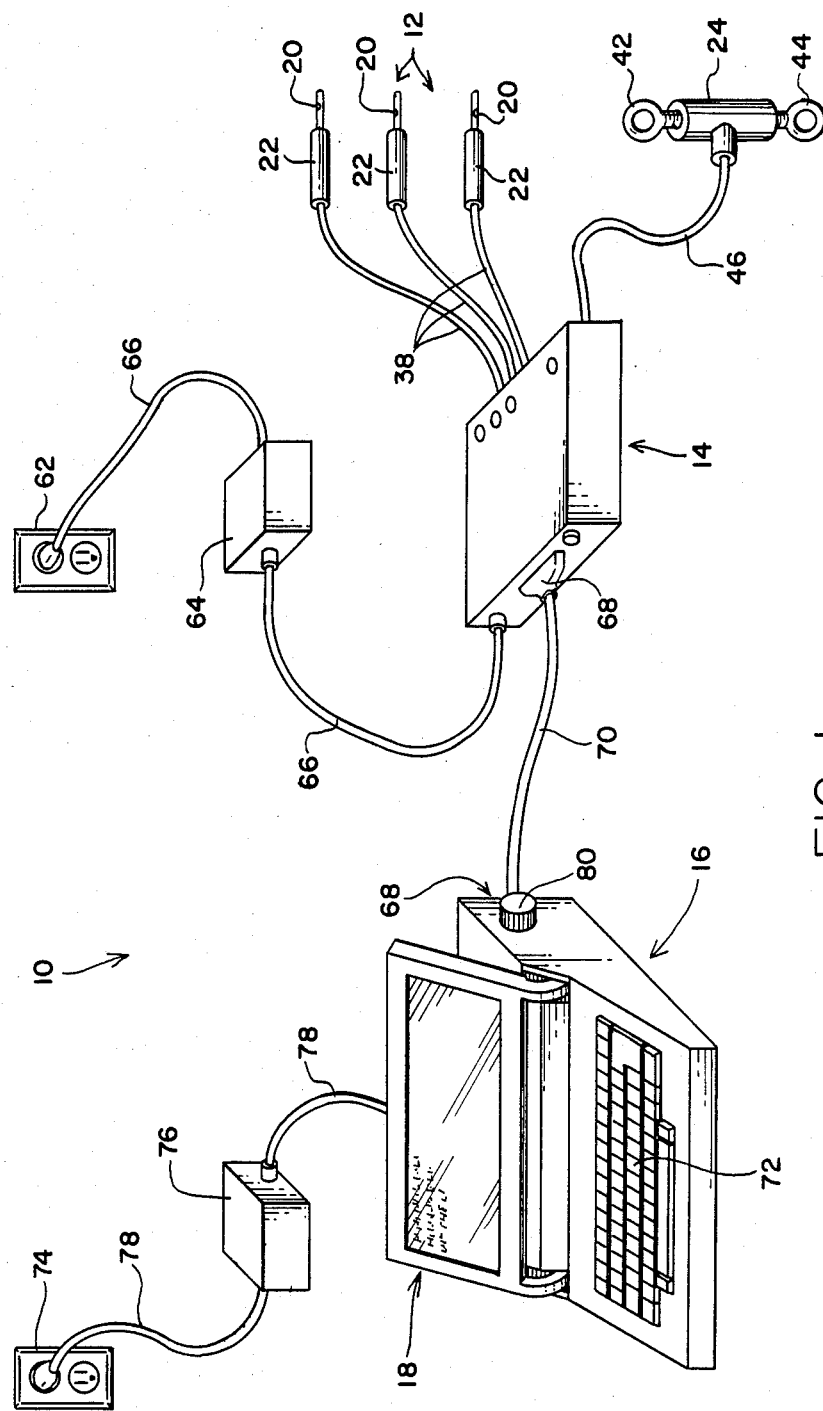
FIG. 1 is a perspective view of the life raft testing device in accordance with the present invention.

Referring to FIG. 1, there is shown at 10 the life raft testing device in accordance with the present invention. Life raft testing device 10 comprises transducer sensors 12, processor 14, controller 16, and output display 18.

Figure 3:
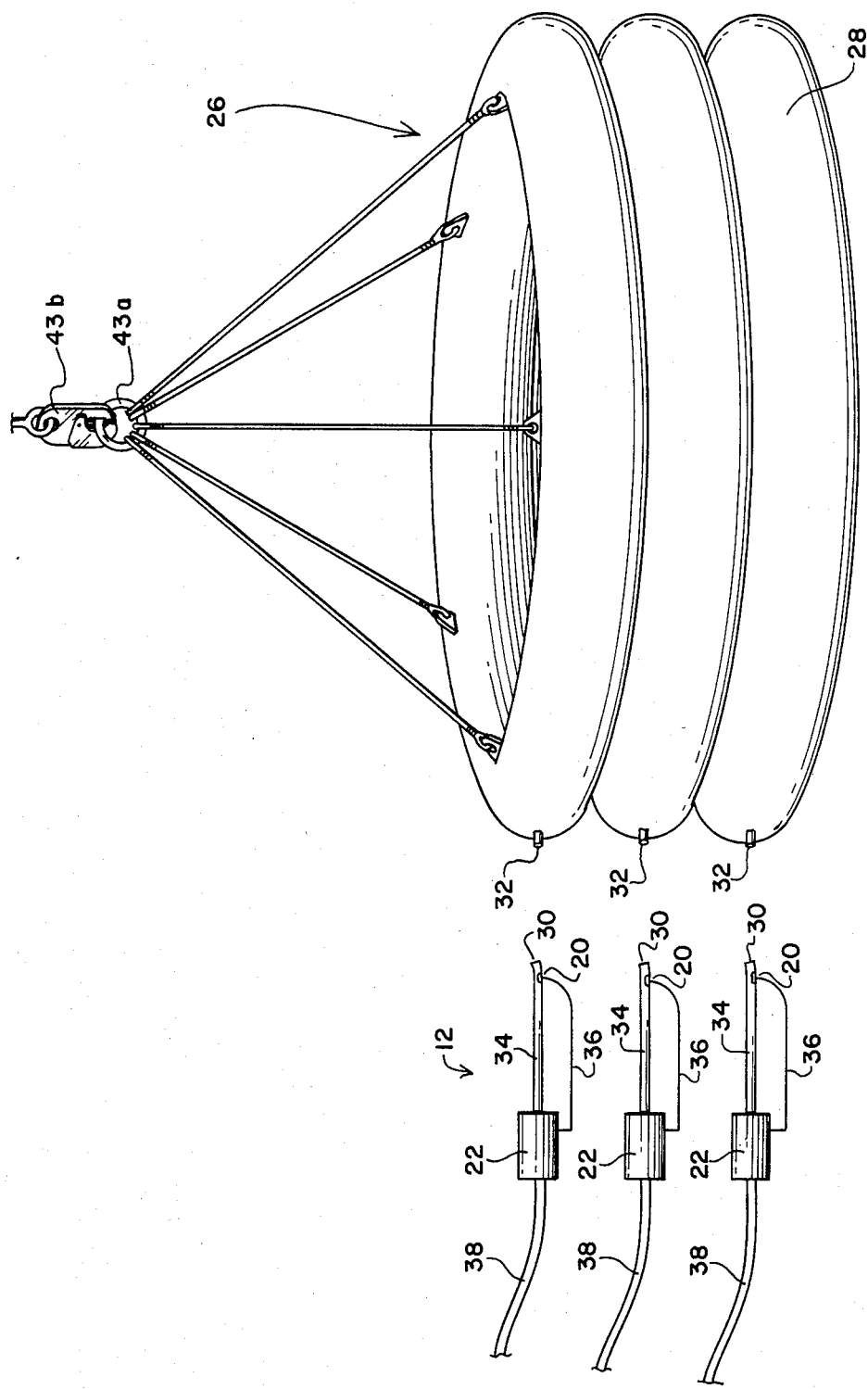
FIG. 3 is a view in side elevation of the arrangement of the transducer sensors with the raft.

Transducer sensors 12 comprise three different types of transducers: temperature transducers 20, pressure transducers 22, and load cell transducer 24. As can be seen in FIG. 3, transducers 12 are arranged so as to interconnect with the valves of life raft 26. Life raft 26 is of the type having a "triple doughnut" configuration. In other words, life raft 26 is made up of three doughnut-shaped inflatable pressure vessels. The bottom pressure vessel 28 comprises a floor attached thereto. It should be kept in mind, that there are many, many types of life rafts and other inflatable objects that are within the scope of the present invention. The life raft 26, as described herein, is but one type of life raft that is particularly suitable for the purposes and functions of the present invention. The design of the life raft itself is in no way intended to be a limitation on the present invention.

Transducer sensors 12 include a nozzle 30 about the end of the transducer that is designed to fit about pressure valves 32 of life raft 26. Chambers 34 extend between nozzles 30 and pressure transducers 22 of transducer sensors 12. When nozzle 30 engages pressure valve 32 of life raft 26, the air communicating therebetween will equalize within pressure chamber 34. When pressure equalization occurs, pressure transducer 22 is able to make a measurement of the approximate pressure within life raft 26.

Temperature transducer 20 is positioned generally adjacent to nozzle 30. The location of temperature transducer 20 allows temperature measurements to be taken of the gas immediately upon escape from pressure valve 32 into chamber 34. As a result, more accurate measurements of the temperature of the gas within life raft 26 may be taken. Temperature transducer 20 uses a single thermally sensitive resistor. As temperature changes, the resistance within the transducer will change. The temperature transducer 20 measures the voltage change resulting from the change of resistance caused by the temperature acting on the transducer 20. Thus, an electrical impulse correlative of temperature can be transmitted through line 36 to processor 14.

Pressure transducer 22 is arranged about the end of chamber 34 opposite nozzle 30. Chamber 34 may be a rigid member, or it may be a hose, communicating with pressure transducer 22. Pressure transducer 22 is of the wheatstone bridge strain gauge variety. This type of pressure transducer incorporates flexible wire in such a way that as the wire bends, the resistance acting on the currents passing therethrough also changes. As with the temperature transducer 20, the change of resistance is measured corresponding to the pressure acting on pressure transducer 22. The change of current caused by the change of resistance about pressure transducer 22 can be correlated to the pressure of the gas within life raft 26. This signal is transmitted to processor 14 by way of lines 38. A similar pressure transducer can be used to measure ambient Barometric pressure at the time of testing.

Load cell transducer 24, as shown in FIG. 1, is designed for measuring life raft weight, davit-launched raft lifting ring integrity, gas supplies, and other physical variables. Load cell transducer 24 utilizes similar electronics as are found in the pressure transducer 22. Specifically, the load cell transducer utilizes a wheatstone bridge type of arrangement so as to form a strain gauge. The change in electrical resistance as caused by loads placed on load cell transducer 24 are correlative of the amount of weight attached to the load cell transducer 24. Load cell transducer 24 has a first hook 42 and a second hook 44. These hooks 42 and 44 are designed for the purpose of attaching to a corresponding hook about the life raft 26 and/or a davit. Davits are the platform-mounted cranes for lowering rafts. In actual use, load cell transducer 24 can measure the integrity of the davit-launched raft lifting ring 43a by attaching the davit-launched raft lifting ring 43a to hook 42 and attaching a loaded raft to hook 44. In typical operations, raft lifting rings should have sufficient integrity to withstand a 5,000 pound load. The integrity of a davit-launched raft release hook 43b can also be tested by fastening a 5,000 load (not necessarily the life raft) to hook 44. In addition to testing the integrity of the release hook 43b, load cell transducer 24 can be utilized to determine the amount of gas remaining in the inflation cylinders. By attaching hook 42 to some fixed object (or to the davit), a weight measurement of the inflation tanks can be accomplished by fastening the tanks to hook 44. The weight of the tanks will be correlative of the amount of gas remaining in the tanks. The electrical impulse indicative of the loads on load cell transducer 24 is passed by way of line 46 to processor 14.

While the embodiment of FIG. 1 shows a single load cell transducer 24, it is possible to incorporate a plurality of load cell transducers as needed for proper testing procedures. One load cell transducer 24 may be of a coarse variety, designed to measure loads ranging to 5,000 pounds, for the purpose of checking davit-launched raft lifting ring 43a and release hook 43b integrity. Load cell transducer 24 also could be of the finer variety that is designed to measure loads corresponding to the weights of typical inflation tanks. The choice of the quantity and quality of load cell transducers 24 is merely a design choice in the construction of the preferred embodiment of the present invention.

Processor 14 acts as an interface between the controller 16 and the transducer sensors 12. The electronics of processor 14 are shown very generally in FIG. 2. It should be noted herewith, that a microcomputer is incorporated within the circuitry of processor 14. The microcomputer is incorporated within the processor 14 so as to allow the processor 14 to be responsive to commands from controller 16. When a command is transmitted by controller 16, the processor 14 parses or identifies the command type, reads parameters passed to it, executes the command and returns the necessary data and status to the controller. The processor 14 then awaits the next command.

Figure 2:
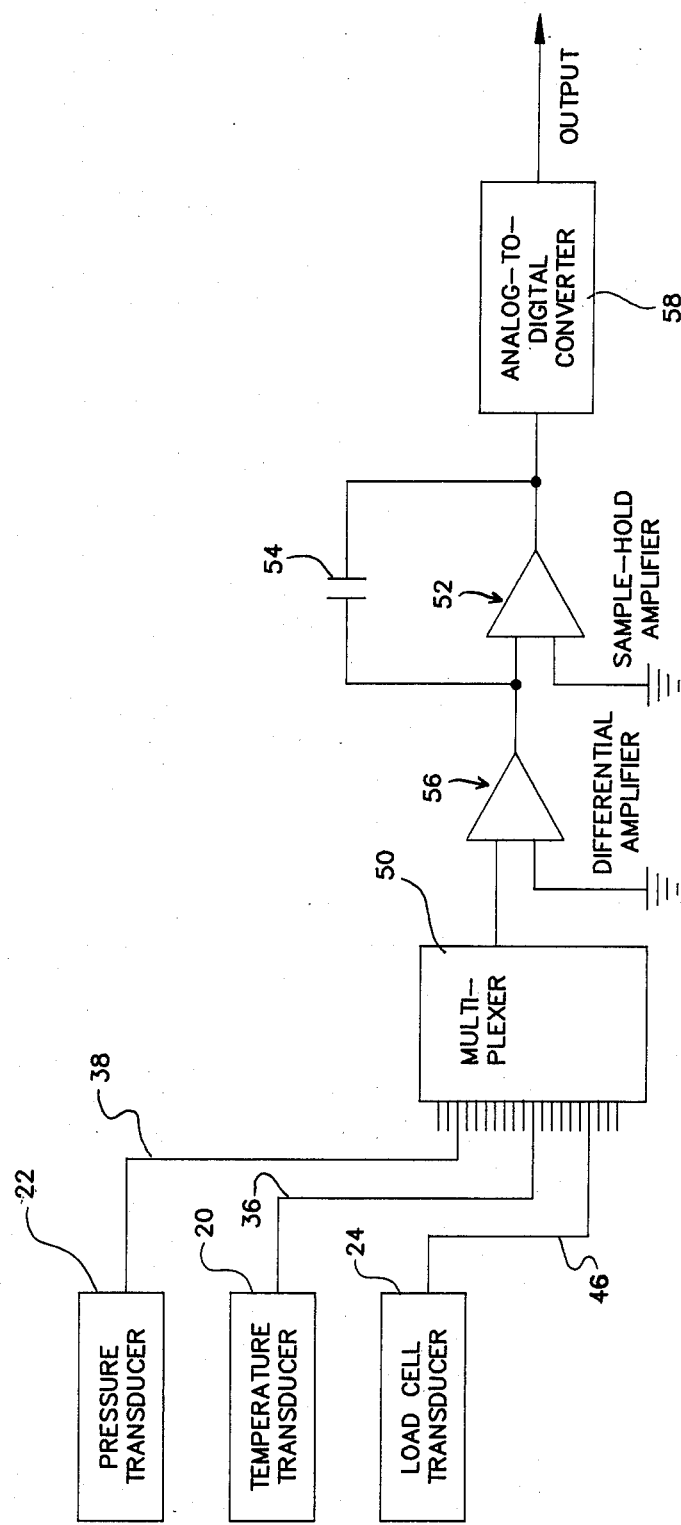
FIG. 2 is a block diagram in partial schematic of the electronics of the present invention.

The information necessary for the interaction between processor 14 and controller 16 is provided by way of the electronics of FIGS. 2. As seen in FIG. 2, the pressure transducer 22, the temperature transducer 20, and the load cell transducer 24 pass their signals by way of lines 38, 36, and 46, respectively. Lines 36, 38, and 46 are connected to analog multiplexer 50. As seen in FIG. 2, multiplexer 50 has a number of input terminals that are adapted so as to receive any additional transducers 12 that may be incorporated into the life raft testing device 10 of the present invention. Analog multiplexing is the process of bringing together a number of different voltage signals, then transmitting each in turn over a single carrier or conductor. At reception, each signal can be reconstituted and identified as to its original source. The analog multiplexer 50 of the present invention incorporates time-division multiplexing which makes the single conductor or carrier available to all voltage signals, but limits the time any one signal may be conducted, with each signal being transmitted in sequence. In this manner, the analog multiplexer acts as a data channel selector which operates under the control of the processor 14 and controller 16. The signal from multiplexer 50 passes to differential amplifier 56.

The signal from multiplexer 50 passes to programmable-gain differential amplifier 56. Programmable-gain differential amplifier 56 provides the ability to increase the signal by a factor of between 1 and 1,024. This gives the user of the life raft testing device 10 the ability to scale the voltage to requirements of the analog/digital converter 58. In addition, differential amplifier 56 serves to measure the difference in current transmitted by the lines associated with the wheatstone bridge arrangement of the pressure transducer 22 and/or the load cell transducer 24.

Sample/hold amplifier 52 receives the signal from differential amplifier 56 and either samples the voltage or holds the voltage. When the sample/hold amplifier "holds" the voltage, it captures the voltage on a capacitor 54. By capturing this voltage and holding it, the input signal is removed, but the output signal keeps its previous value. This allows a smoothing out of the waveform to eliminate the problems of interference, noise, and jitter during the conversion period required by the A/D converter.

Analog-to-digital converter 58 receives the signal as passed by sample-hold amplifier 52. As the name implies, analog-to-digital converter 58 converts the analog signal from sample-hold amplifier 52 into a digital equivalent. The analog-to-digital (A/D) converter is a hybrid electronic component. It contains a laser-trimmed binary-weighted thin film resistor network and a precision internal voltage reference. The analog-to-digital converter uses the successive-approximation technique. In this method an arbitrary binary digital value is first converted to a test voltage in the resistor network which forms a digital-to-analog (D/A) converter. This test voltage is compared to the original signal voltage. Depending on whether the test voltage is greater or lesser than the signal voltage, the binary digital value applied to the D/A network is adjusted incrementally down or up. When the test voltage and the signal voltage are equal, the binary digital value will accurately represent the binary scaled magnitude of the original analog voltage. This accuracy will be within plus or minus one-half least significant bit (LSB) at the end of the conversion process. In the preferred embodiment of the present invention, the analog-to-digital converter is of the twelve-bit binary type which provides a resolution of one part in 4096, or 0.025%. The digitized signal from analog-to-digital converter 58 is passed as output to either the processor 14 or the controller 16.

As was stated previously, processor 14 includes a microprocessor that reads the commands from the controller 16 and also controls the multiplexer 50, the sample/hold amplifier 52, the differential amplifier 56, the analog-to-digital converter 58, any associated warning lights 60, and can include a self-test capability in an incorporated program. The microprocessor within processor 14 includes an EPROM or ROM circuit that keeps the calibration values within the processor 14. Since the processor 14 is a sealed unit, the circuitry and programming therein are tamper-proof. Through this arrangement, it is virtually impossible to alter the values of the received signals within processor 14. Ideally, and in accordance with the preferred embodiment of the present invention, processor 14 comprises an RCA Micro Board 1802 CMOS (i.e., Complimentary Metal Oxide Semiconductor) microcomputer.

Processor 14 is, ideally, battery powered. Since the life raft testing unit 10 of the present invention will have great application in offshore usage, it is preferable to have a battery powered unit. However, where AC voltage is available, the present invention may be powered by a typical electrical outlet 62. An AC-DC adapter 64 is interposed along the electrical line 66 from outlet 62 to processor 10. AC-DC adapter 64 converts the alternating current from the outlet 62 into a battery-type DC power source. Adapter 64 may also include proper circuitry for converting the standard 220 volts of alternating current (as used in many foreign countries) into DC power, as well as converting the U.S.-standard 120 volts AC. This arrangement allows the life raft testing unit 10 of the present invention to be adaptable to a wide variety of locations and uses.

The digitized signal information from processor 14 is passed to controller 16 through a standard RS232 serial port 68. A cable 70 serves to transmit this information between the serial ports 68 for up to 200 feet distance.

The controller 16 comprises an input/output keyboard 72. Input/output keyboard 72 allows the operator of the life raft testing device 10 to load the test protocol computer software program, conduct the test, record the results and print a pass/fail certificate. Initiation of the test protocol program requires that the user enter the correct unique security password into the input/output keyboard 72, in order to prevent unauthorized use or tampering. Controller 16 also includes a mass storage device of the diskette drive or bubble memory variety. These mass storage devices allow the information transmitted to the controller 16 from processor 14 to be recorded for short term or long term purposes. These mass storage devices also store the test protocol computer software programs. Ideally, and in accordance with the preferred embodiment of the present invention, controller 16 comprises a Sharp PC-5000 portable computer.

The output display 18 is a liquid crystal display of information processed through processor 14. As seen in FIG. 1, liquid crystal display 18 is attached generally adjacent to keyboard 72 of controller 16. Visual display 18 uses a menu-driven screen format to display protocol prompting and other data to the operator of the life raft testing device 10. The screen 18 is compatible with eight lines of 80 characters each, as allowed by the preferred Sharp portable computer.

Alternatively, output display 18 could be a cathode ray tube display which would present information required by the operator. Since the liquid crystal display requires less power than the CRT-type of display, it is believed that the liquid crystal display is preferrable for remote usage of the life raft testing device 10. Also, the output display of the present invention can be a serial line printer associated with controller 16. This serial line printer offers a typed report of information presented onto displays 18 or other information available from processor 14.

Controller 16 and output display 18 are, ideally, battery powered. However, power can be made available to the controller 16 through a standard 120 volt AC outlet 74. As shown in FIG. 1, an AC-DC adapter 76 is interposed along electrical line 78 so as to convert the current from outlet 74 into a form usable by controller 16 and output display 18. A foreign-standard 220 volt AC-DC adapter may also be used where necessary.

In operation, the present invention acts as a life raft testing device by monitoring the various physical conditions surrounding and impacting upon the use and operation of the life raft 26. The temperature and pressure conditions of the life raft are monitored through the use of temperature transducers 20 and the pressure transducers 22. The integrity of the davit-launched raft lifting ring 43a and the raft release hook 43b, the weight of the raft, and the gas in the inflation tank are monitored through the use of the load cell transducer 24. Each of these conditions is transmitted as an electrical impulse to the processor 14. Processor 14 multiplexes the signal from the transducers 12, amplifies the signal, holds the signal, and converts the analog signal to a digital output. The microprocessor within processor 14 parses the command from the controller 16, reads the parameters passed to it, executes the command, and returns the necessary data and machine status information to the output display 18. The microprocessor within processor 14 also serves to calibrate the digital signal so as to represent the physical values tested from the raft 26. Information is passed from processor 14 through serial port 68 and cable 70 to controller 16. Controller 16 accesses the information from the processor 14. For example, if pressure information is required, then the suitable operator-initiated input request could be typed in on input/output keyboard 72. Such accessing would cause the pressure information to be displayed upon the liquid crystal display 18. Also, as an example, if temperature information were required, then the suitable access code could be typed in on keyboard 72 and temperature information would be displayed on the liquid crystal display 18.

The processing of information, the data relative to temperature, pressure, weight, loads, etc., would be recorded and stored on diskettes or bubble memories included within controller 16. Also, a typed output of this information could be received by utilizing line printer 80. This typed output of the test results could be the official inspection certificate. This typed output summarizes the test results, indicates whether the raft passed or failed inspection, the name of the tester, and other information pertinent to the characteristics of the life raft. The following is an example of the typed output of the test results:

---

SAFE-TEST, INC        Certificate Serial No. A-15082
LIFERAFT SERVICING/REINSPECTION REPORT

CUSTOMER DATA
Customer: Bentley Marine    Ship/Rig: Blue Marlin

RAFT DATA
Inspection Date: 03/05/84    Raft Manufacturer: B. F. Goodrich
Type of Inspection: 5 YEAR   Raft Type: MM-MK3
Raft MFG Date: 09/80         Serial No.: 25 MMUS 4
Type Approval: 160.051/53-1  Raft Lot No.: 207

TWO-HOUR LEAK TEST RESULTS
Initial Reading:

| LOCATION | TIME | BARO | TEMP | PSI | CORRECTED |
|---|---|---|---|---|---|
| UPPER TUBE | 09:00 | 30.02 | 68 F. | 2.4 | |
| LOWER TUBE | | | | 2.5 | |
| FLOOR | | | | .4 | |

Final Reading:

| LOCATION | TIME | BARO | TEMP | PSI | CORRECTED |
|---|---|---|---|---|---|
| UPPER TUBE | 11:00 | 30.08 | 70 F. | 2.5 | |
| LOWER TUBE | | | | 2.5 | |
| FLOOR | | | | .4 | |

Number of Test Attempts: 1

GAS CYLINDER DATA
Cylinder Number: 1    Serial No.: MM18619
Tare Wt (lbs): 41.85  $CO_2$ Wt: 24.40  $N_2$ Wt: 1.50  Total Wt: 67.55
Number of Test Attempts: 1   Hydro Test Due Date: 06/85
Cylinder Number: 2    Serial No.:
Tare Wt (lbs):  $CO_2$ Wt:  $N_2$ Wt:  Total Wt:
Number of Test Attempts:   Hydro Test Due Date:

INSPECTION RESULTS

| | | | |
|---|---|---|---|
| OK | Cylinder Valve & Adapter | OK | Heaving Line |
| OK | Cylinder Pull Cable | OK | Legible Markings |
| R | Hoses (2) | R | Container |
| OK | Elbow Fittings Inflation | OK | Container Seal |
| OK | Inlet Valves (2) | OK | Painter 100 Ft |
| R | Topping Up Valves (2) | OK | Inflation Pump |
| OK | Sea Light, Inner | OK | Repair Clamps |
| OK | Sea Light, Outer | OK | Instruction Manual |
| R | Sea Cells (2) | OK | Sea Anchor, Spare |
| OK | Nameplate, Raft & Container | OK | Plugs/Clamps for Relief Valves |
| OK | Sea Anchor Attached to Raft | OK | Paddles |
| OK | Life Line, Inner | OK | Ladders |
| OK | Life Line, Outer | | |

Five Year Inflation Test Status:   PASS

EQUIPMENT

| | | | |
|---|---|---|---|
| OK | Emergency Pack | R | Provisions (1#/Person) |
| OK | Equipment Bag | R | Repair Kit |
| OK | Bailer*1 (6 & 10) 2 (15.20 & 25) | R | Signals, Rocket Propelled (2) |
| OK | Knife*1 (6 & 10) 2 (15.20 & 25) | R | Signals, Comb Flare & Smoke (6) |
| OK | Drinking Cup | OK | Sponge (2) |
| OK | First Aid Kit | R | Water (3 pint/person) (15 Bags) |

-continued

| | SAFE-TEST, INC | | Certificate Serial No. A-15082 |
|---|---|---|---|
| | LIFERAFT SERVICING/REINSPECTION REPORT | | |
| OK | Flashlight | R | AntiSeasickness Tabs (6/Pers) 150 |
| R | Spare Cells (3) | OK | Tin Opener (2) |
| OK | Spare Bulbs (2) | OK | Whistle |
| OK | Mirror, Signalling | OK | Fishing Kit |
| OK | Desalter Kit | | |

CODE:
R = Replace;
OK = Satisfactory
Serviced at:
Alexander Industries, Inc.
2332 Wayside Drive
Houston, Texas 77001
(713) 923-1671
By: Jim Smith The present invention can be utilized so as to develop a computer database relative to life raft information. The information from the diskettes or bubble memories could be shipped to a central computer area and recorded in a database. This database could then be used to keep track of all of the pertinent information on any life raft tested. All of the information from the above test report can be transmitted and recorded in a central database. As a result, a comprehensive compilation of life raft information can be accumulated. The information from the database can be extremely useful in the life raft manufacturing and testing industry and in oversight/supervision of the inspection process by government or quasi-legislative regulatory bodies.

The present invention is adaptable to a variety of uses. The scheme of the present invention would allow it to be adaptable for testing helicopter floats, commercial aircraft inflatable escape chutes, service craft life rafts, hand held fire extinguishers, fire extingisher systems, and fired and unfired pressure vessels. Thus, although the preferred embodiment of the present invention is directed to a life raft testing device, this is not intended as a limitation on the present invention. The present invention is adaptable to a wide variety of situations where portability, accuracy, and security are of prime concern.

The present invention is particularly suited for testing life rafts in remote locations. The entire life raft testing device 10 is portable and can be easily carried by one man. Since the system can operate for several hours continuously on battery power, there is no need to have the system adjacent to some source of alternating current. The many ports available on the multiplexer allow the life raft testing device 10 to be capable of concurrently testing multiple life rafts. This testing unit can support the selection of multiple test protocols. In its initial design, the present invention utilizes standard (off-the-shelf) components and subassemblies. Additionally, the life raft testing device of the present invention is designed so as to allow operation of the unit by field or service station personnel following a minimum of instruction. Since most instruction is provided within the control unit 16 and displayed on the output display 18, the servicing personnel have continual access to information on how to operate the system.

The present invention is a major improvement over the previous non-automated method of testing life rafts in remote locations. Previously, the U.S. Coast Guard was required to supervise all inspection operations. Such supervision wasted man-hours and resulting in much confusion and other inefficiencies. The present invention, however, provides a complete and tamper-proof recording of the testing procedure. All the information obtained from the testing of the life raft is indelibly recorded in the diskette or bubble memory of controller 16. Thus, the present invention eliminates the need for and the waste of Coast Guard man-hours. Also, the present invention eliminates much of the man-hours required for testing life rafts by being capable of multiple testing simultaneously.

The foregoing disclosure and description of the invention is illustrative and explanatory thereof, and various changes in the details of the illustrated apparatus may be made within the scope of the appended Claims without departing from the true spirit of the invention. The present invention should only be limited by the following Claims and their legal equivalents.

I claim:

1. A testing device for evaluating the physical parameters of a life raft comprising:

transducer means for converting the physical inputs from said life raft to electrical impulses, said transducer means comprising:

a pressure transducer for evaluating the pressure of a gas within said life raft, said pressure transducer having a chamber connected thereto;

a temperature transducer having a nozzle for connection to a valve of said life raft, said temperature transducer positioned adjacent said nozzle; and a load cell transducer for weight measurement of said life raft;

connection means fastened to said transducer means for enabling said transducer means to be interactive with said physical input from said life raft, said connection means comprising:

a pressure transducer nozzle for connection to a valve for said life raft, said chamber of said pressure transducer being adjacent to and in air-tight connection with said pressure transducer nozzle, said chamber for allowing differential pressures within said chamber and said life raft to equalize upon connection of said pressure transducer nozzle to a valve of said life raft; and a load cell hook physically connected to said load cell transducer for receiving the weight to be measured of said life raft, said load cell hook being interactive with said load cell transducer;

processing means electrically connected to said transducer means for selectively converting said electrical impulses of said transducer means into signals relative to said physical inputs each of said pressure transducer, said temperature transducer, and said load cell transducer having electrically conductive lines extending therefrom to said processing means, the signals from said transducer means being passed as separate inputs to said processing means; said processing means evaluating said life raft based on said signals;

control means electrically connected to and interactive with said processing means for selectively manipulating said signals from said processing means; and output means electrically connected to said control means for producing a perceivable display of said signals from said processing means.

2. The device of claim 1, said processing means comprising:

differential amplifier means electrically connected to said transducer means for producing an analog signal relative to a selected one of said electrical impulses from said transducer means; and analog-to-digital converter means electrically connected to said differential amplifier means for converting said analog signal to a digital output.

3. The device of claim 2, said processing means further comprising:

multiplexer means electrically connected to said transducer means, said multiplexer means receptive of the signals from said transducer means, said multiplexer means selectively passing a signal to said differential amplifier means.

4. The device of claim 3, said processing means further comprising:

sample/hold amplifier means electrically connected between said analog-to-digital converter means and said differential amplifier means, said sample/hold amplifier means for capturing the voltage output from said multiplexer means for a predetermined period of time.

5. The device of claim 1, said control means comprising:

an input/output keyboard connected to and interactive with said processing means through a RS232 communication line.

6. The device of claim 1, said output means comprising a video display terminal connected to and interactive with said control means and said processing means.

7. The apparatus of claim 1, further comprising:

a battery power supply connected to said processing means for providing electrical energy to said processing means.

* * * * *